May 15, 1951 J. M. HAYWARD ET AL 2,553,255

TELEPHONE SUBSTATION APPARATUS

Filed Sept. 28, 1948 3 Sheets-Sheet 1

INVENTORS J. M. HAYWARD
C. A. JOHNSON, JR.
W. R. NEISSER

BY C. A. McCorkendale
ATTORNEY

May 15, 1951 J. M. HAYWARD ET AL 2,553,255

TELEPHONE SUBSTATION APPARATUS

Filed Sept. 28, 1948 3 Sheets-Sheet 2

J. M. HAYWARD
INVENTORS C. A. JOHNSON, JR.
W. R. NEISSER
BY J. A. McCorkendale
ATTORNEY May 15, 1951 J. M. HAYWARD ET AL 2,553,255

TELEPHONE SUBSTATION APPARATUS

Filed Sept. 28, 1948 3 Sheets-Sheet 3

INVENTORS J. M. HAYWARD
C. A. JOHNSON, JR.
W. R. NEISSER

BY J. A. McCorkindale
ATTORNEY

Patented May 15, 1951

2,553,255

UNITED STATES PATENT OFFICE 2,553,255

TELEPHONE SUBSTATION APPARATUS

John M. Hayward, Summit, Charles A. Johnson, Jr., Murray Hill, and Wilson R. Neisser, East Orange, N. J., assignors to Bell Telephone Laboratories, Incorporated, New York, N. Y., a corporation of New York Application September 28, 1948, Serial No. 51,612

2 Claims. (Cl. 179—100)

This invention relates to telephone substation apparatus and more particularly to an apparatus unit for use in connection with a telephone substation set.

An object of the invention is to improve the operation of telephone substation apparatus and to substantially reduce the cost incident to the initial production of such apparatus.

Telephone substation apparatus includes, in addition to the elements familiar to all users, i.e. the transmitter, the receiver, the supporting means therefor and the bell or ringer, certain other essential elements such as inductive coils, condensers, resistors and the like, the exact combination depending to some extent upon the specific type of substation circuit involved. In the past it has been the common practice to mount these less familiar elements, together with the ringer, in a separate box technically termed the subscriber set but commonly referred to as the "bell box." More recently, the practice has been successfully introduced of mounting these elements in the base of the telephone set itself thereby producing the type of substation instrument commonly referred to as a combined hand telephone set.

The apparatus unit contemplated by the present invention is applicable particularly to the combined type of telephone set although it is also applicable to the older type wherein elements are mounted separate from the telephone instrument itself.

In accordance with a feature of the present invention a substantial portion of the elements of a telephone substation installation, i. e. exclusive of the "familiar" elements, are compactly grouped within a common container thereby resulting in manufacturing economy, a marked simplification of station set assembly and wiring, and other important advantages which will be readily apparent from the following description. In particular, this common grouping of elements, previously separately housed and mounted, permits a common potting treatment for all the elements; that is, all the elements may be subjected to the same application of a potting compound.

In accordance with a further feature of the invention, a novel terminal arrangement is provided for the apparatus unit whereby connections that are apt to require changing from time to time at the subscriber's premises are of a type requiring only the use of a screw-driver tool, (no soldering operation involved), while connections that are not apt to require changing are, by design, of a more permanent nature whereby to eliminate accidental and unplanned disturbance thereof by the installer or repairman.

In accordance with still another feature of the invention, means are provided whereby the external conductors, as placed in position adjacent to the associated terminals during manufacture of the apparatus unit, are temporarily held in such positions until all the wires have been so positioned. The entire wiring assembly may then be simultaneously permanently connected by a single "mass soldering" operation.

In accordance with yet another feature of the invention a novel terminal arrangement is provided for certain of the capacitors whereby the terminal members serve not only as such but also as the mechanical supporting means for said capacitors.

In accordance with another feature of the invention novel means are associated with one of the inductive coils which serve not only as clamping means for the core laminations thereof but also as the mechanical supporting element for the coil assembly.

In accordance with a specific embodiment of the present invention, certain of the essential elements of a subscriber's telephone circuit, which for the purpose of the present description alone will be assumed to be of the general type described in the copending application of Botsford-Boyson-Aikens-Dietze-Goodale-Inglis, Serial No. 793,170, filed December 22, 1947, entitled "Subscriber Telephone Set," are compactly grouped and mounted in a common metallic housing. The elements so grouped include the induction coil of the anti-sidetone circuit; the auto-transformer and associated resistor and capacitor which comprise the balancing network; the resistor and capacitor provided for suppression of dial interference; and an additional capacitor utilized in the transmission circuit.

A plate of suitable insulating material serves as a cover for the housing, as a mechanical support from which the various elements are "hung" for mechanical support, and as a terminal plate or connecting block.

The grouping of these various elements in a common housing is an essential step in the attainment of maximum compactness, results in manufacturing economy and greatly simplifies and facilitates station assembly and wiring. The common housing serves as a constraining means for the required moistureproofing compound, which may thus be applied to all the elements as a unit, and, in addition, provides magnetic shielding whereby to prevent cross-talk.

A full understanding of the arrangements contemplated by the present invention and appreciation of the various desirable features thereof may be gained from consideration of the following detailed description and the attached drawings in which.

Figure 1:
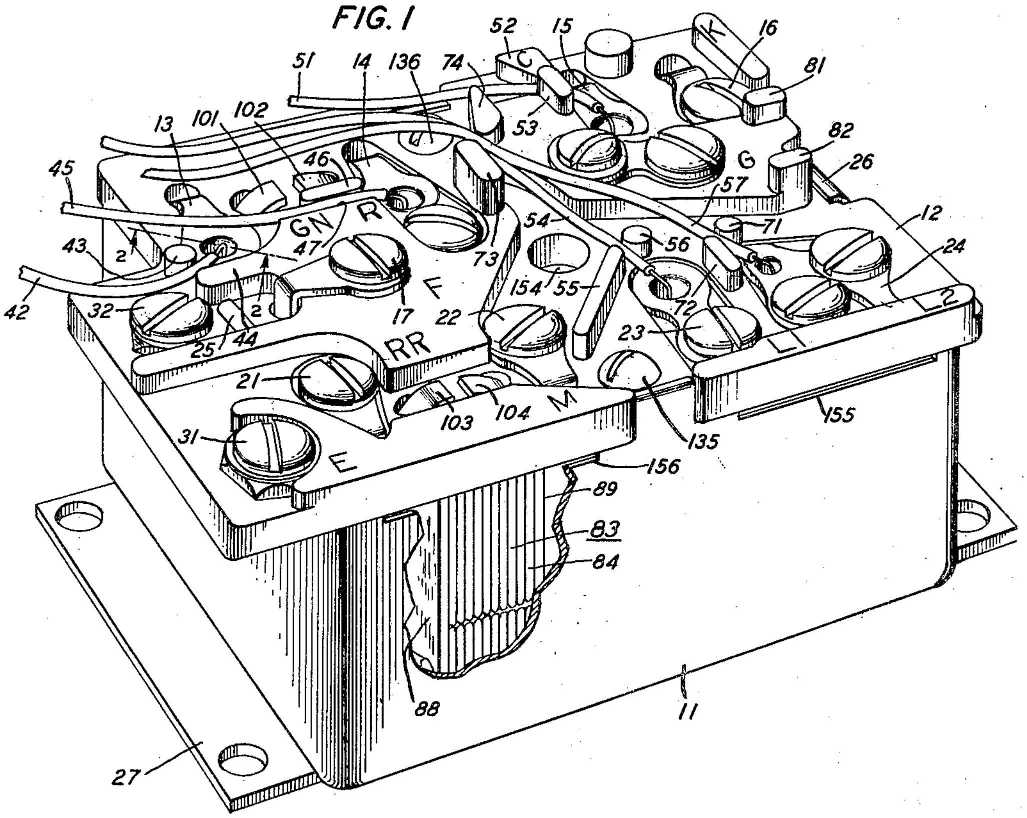
Fig. 1 is a plan view of the apparatus unit showing particularly the arrangement of the connecting block (cover), a portion of the housing wall being broken away to show one of the elements mounted therein.

Referring now to the drawings, and first to Fig. 1, an apparatus unit of the general type contemplated by the present invention is illustrated comprising a bowl-like metallic housing 11 provided with a cover 12 of suitable insulating material. Cover 12 serves also as a terminal plate or connecting block and, as shown, is provided with strategically located terminals. These terminals are both of the soldered type, as 13, 14 and 15 and of the screw type as 16, 17, 21 and 22. Certain of the terminals, as 23 and 24, provide for both solder and screw-type connections.

Cover 12 is held in position on the housing by suitable ears 25 and 26 which extend upward from the housing and project through suitable recesses or apertures in connecting block or cover 12 and are subsequently bent over to contact the upper surface of the cover. Housing 11 is provided with a suitable flange or mounting plate 27 to facilitate mounting.

In addition to the terminals mentioned, certain "free" terminals, as 31 and 32, are provided for convenient interconnection of other parts of the substation equipment.

It is contemplated that in certain instances, during manufacture and assembly of the apparatus unit, all of the external conductors or leads which are subsequently to be soldered to terminals of the connecting block may first be assembled adjacent to the respective terminals after which they may all be soldered permanently in place by a single simultaneous operation referred to as "mass soldering." Obviously such a method, if successfully practiced, offers many advantages from the standpoint of economical manufacture and, in order to render such a method feasible in the present instance, the novel method illustrated of temporarily holding the conductors in position has been provided.

As shown, opposed projecting members have been provided at strategic positions on the connecting block, the separation between the respective opposed members being exactly determined in accord with the diameter of the respective wire or wires to be accommodated whereby the space provided in each instance is such that the respective wire or wires may be forced down between the opposed members and held thereby until the soldering operation has been completed. For example, wire 42 is held in soldering position by contact with the opposed surfaces of projections 43 and 44; wire 45 by members 46 and 47; wire 51 by members 52 and 53; wire 54 by members 55 and 56; and wire 57 by members 71 and 72. On occasion this same plan may be utilized to position the wires at points remote from the terminals in order to provide a neater assembly and facilitate the wiring; for example, as illustrated, wires 54 and 57 are subjected to the additional positioning support of members 73 and 74.

It will be understood that it is contemplated that wires of various diameters will be utilized in the assembly, the spacing of the respective members being exactly determined in each instance by the diameter and the number of the wires to be accommodated.

Figure 2:
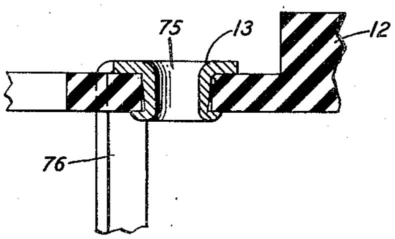
Fig. 2 is a partial sectional view taken on line 2—2 of Fig. 1 showing the arrangement of one of the soldering terminals.

As shown particularly in Fig. 2, terminal 13, which is typical of both the solder and screw type terminals, is provided with wire and solder receiving aperture 75 and extension 76 which projects downwardly into the housing for a purpose described subsequently. The terminal is held in position in connecting block 12 by upsetting eyelet portions as illustrated. When this terminal is used for screw connections the aperture 75 is tapped to receive the terminal screw.

Figure 3:
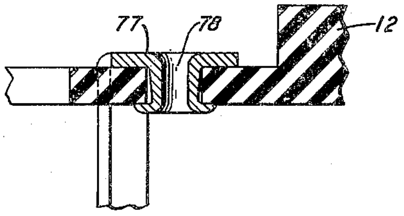
Fig. 3 is a sectional view similar to Fig. 2 but showing a modified form of soldering terminal.

In certain instances trouble has been encountered through solder dropping down through the wire receiving aperture into the housing and causing electrical shorting of the elements therein. In order to forestall the possibility of such troublesome occurrence the novel type of terminal illustrated in Fig. 3 may be provided. In the instance of this modified terminal 77, it will be observed that aperture 78 is of substantially reduced size as compared to aperture 75 of terminal 13; the size of aperture 78, as a matter of fact, being such that it is substantially entirely closed by the wire positioned therein. The possibility of solder dropping through the aperture into the housing and causing damage is therefore eliminated.

In addition to the spaced projections on plate 12 referred to above, other projections are provided at strategic points for different purposes. For example certain of the projections, as 81 and 82, serve to prevent undesired lateral movement, beyond predetermined allowable narrow limits, of wire terminals or "spade tips" which may be connected to the screw-type terminals on plate 12.

Figure 4:
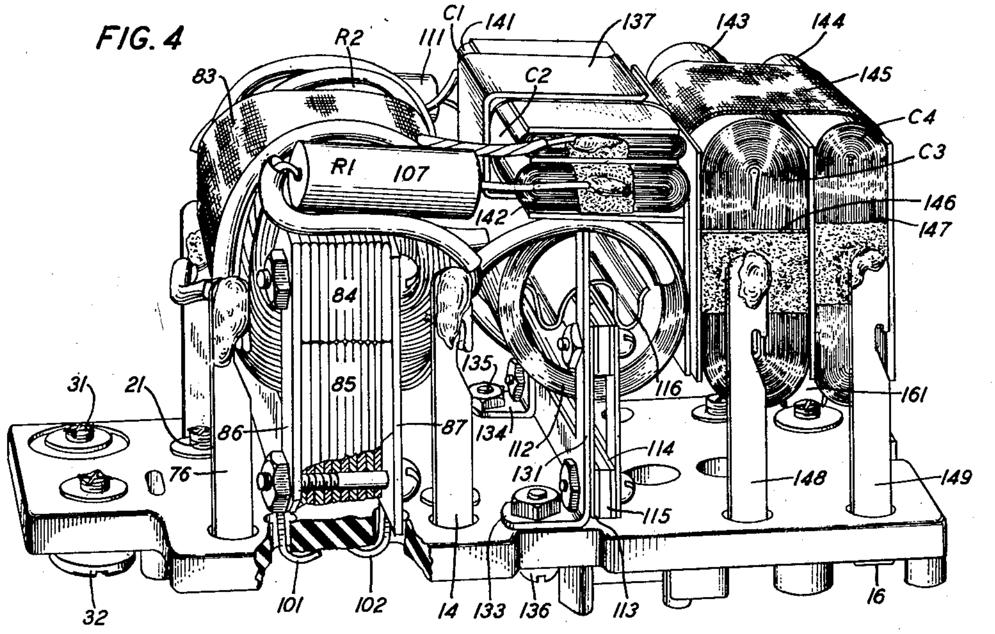
Fig. 4 shows the cover with elements supported thereby, removed from the housing and inverted to better disclose the elements, a portion of the cover being broken away to show the manner of supporting the induction coil.

Referring now to Fig. 4, and considering first induction coil 83, which is also shown in part in Fig. 1, this device comprises a two-winding coil of usual construction positioned on a core which is made up of two groups of L-shaped magnetic laminations 84 and 85 assembled to form a rectangular core with butt-type air-gaps. Four similar end members 86 and 87 (Fig. 4) and 88 and 89 (Fig. 1) are provided which serve, in conjunction with suitable bolts and nuts, as clamping means for the core laminations. Each of these members is provided with an extending tab on each end, the four upper extending tabs being adapted to pass through apertures in cover 12 and to be bent over whereby to mechanically "hang" induction coil 83 from cover 12 thereby providing its sole mechanical support. This turned-over or upset position of respective upper extensions 101 and 102 of members 86 and 87 is illustrated in Figs. 4 and 1 while the similar position of upper extensions 103 and 104 of members 88 and 89 is shown in Fig. 1.

The downwardly extending portions of clamping members 86, 87, 88 and 89 are useful in positioning other elements of the assembly; for example extensions 105 and 106 (Fig. 5) of members 86 and 87 serve to aid in positioning resistor 107 while the downward extensions of members 88 and 89 (not illustrated) aid in the positioning of resistor 111 (Fig. 4).

Figures 5, 6, 7:
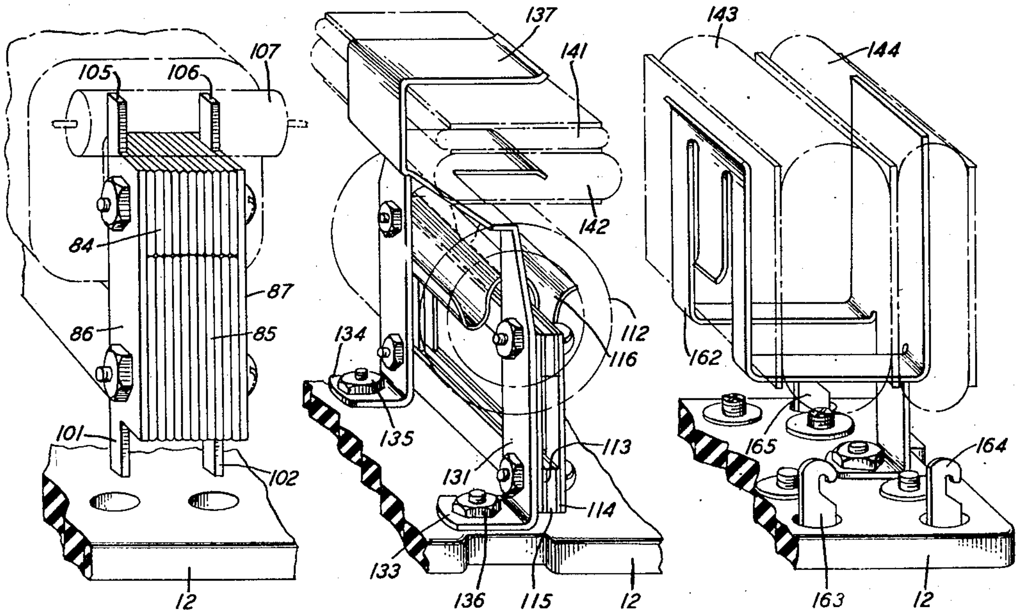
Fig. 5 is an end view in partial section showing particularly the core arrangement of the induction coil and the clamping and supporting means associated therewith.
Fig. 6 is a view in partial section showing particularly the coil and core arrangement of the auto-transformer and the capacitor supporting means associated therewith.
Fig. 7 is a view in partial section showing a modification of one of the capacitor supporting means shown in Fig. 4.

Referring still to Fig. 4, and also to Fig. 6, autotransformer 112 comprises a single-winding coil positioned on the upper leg of a core which is made up of two groups of U-shaped magnetic laminations 113 and 114; these two groups of laminations are assembled with a similarly shaped separator 115 of insulating material positioned between the two groups whereby an "elongated" or "lateral" air-gap is provided. In view of the relatively large difference between the inner diameter of the coil and the size of the core leg a spacer 116 has been provided for maintaining the coil in stable position on the core leg. Spacer 116 may conveniently be in the form of a cellulose acetate sheet pleated and allowed to expand against the inner surface of the coil due to its natural resiliency.

Lamination groups 113 and 114 and spacer 115 are clamped in assembled position by the action of side plate 131 in conjunction with suitable bolts and nuts. As shown most clearly in Fig. 6 side member 131 is provided with angular ears 133 and 134 which engage the inner surface of cover plate 12. This permits the auto-transformer to be "hung" from the under side of the cover plate thereby providing the sole mechanical support therefor; suitable machine bolts 135 and 136 (Figs. 6, 4 and 1) are provided for attaching supporting ears 133 and 134 to cover 12.

As shown in both Figs. 4 and 6, side clamping member 131 is provided with a downwardly extending portion (i. e. "downwardly" with respect to the normal assembled condition of the unit as shown in Fig. 1), which terminates in a U-shaped clamping member 137. This member 137 receives and securely holds in proper position capacitors 141 and 142; suitable flat or appropriately formed sheets of insulating material may be provided, as illustrated, to separate the two capacitors from each other and from the surface of clamp 137.

It will be apparent from the above that there has been provided a novel unitary means which efficiently performs three important functions in the assembly; namely provides clamping action for the core members, provides mounting means for the two capacitors, and provides means for supporting the entire assembly from the cover. This novel arrangement adds materially to the compactness and mechanical assembly of the apparatus unit contemplated by the invention.

Referring again to Fig. 4, capacitors 143 and 144, which are preferably of the metallized paper type, are bound together as a compact unit by insulating tape 145. The capacitors are preferably provided on each end with connecting means in the form of a "schooped" metallic deposit in the general manner disclosed by Sträb Patent 2,274,011 and Dorn Patent 2,323,020. Thus capacitors 143 and 144 are provided on one end with conductive connecting portions 146 and 147 respectively, and on the opposite ends with similar conductive portions (not illustrated). In the present instance, advantage is taken of this construction whereby to provide, in a novel manner, a combined supporting and external connecting means for the two capacitors.

As shown in Fig. 4, terminals 15 and 16 (Fig. 1) are provided with respective downwardly extending portions 148 and 149 while terminal 24 (Fig. 1) is provided with a similar extending portion 161 which is partially shown in Fig. 4. Extension 148 makes electrical contact with connecting surface 149 of capacitor 143; extension 149 with connecting portion 147 of capacitor 144 and, in a similar manner, extension 161 makes electrical contact with the conducting surface (not shown) provided on the other end of capacitor 144. (These contacts are preferably made by soldering, the schooped coatings provided on the ends of the capacitors permitting such procedure.) In addition to their function of providing electrical connections, the ends of the extension portions are so spaced with respect to the longer dimensions of the capacitors that the two capacitors, which are assembled as a unit by the tape 145, are held snugly between the terminal extensions which thereby serve the dual function of providing the necessary electrical connections to the capacitors and also the means for mechanically "hanging" the capacitors from cover 12 thereby providing the sole mechanical support therefor.

If desired the modification illustrated in Fig. 7 may be provided in accordance with which a separate mechanical support, in the form of U-shaped bracket 162, is provided for the support of capacitors 143 and 144; in this instance the capacitors are snugly held by the bracket, suitable separators in the form of insulating sheets being provided as required. When this modification is used terminals 15, 16 and 24 are provided with short extensions, 163, 164 and 165, respectively, flexible leads being provided for completion of the connections to the capacitors.

A still further modification of the capacitor mounting arrangement may be provided if desired by in effect extending the bracket 137 of Fig. 6 so that it forms a mounting clip for capacitors 143 and 144. This mounting clip not only supports the associated capacitors, but by its clamping action prevents loss of capacity due to swelling of the capacitors from the heat of the potting operation. The modified bracket 150 (Fig. 8) may be provided with an extension 151 arranged to rest against the under side of the cover plate 12 or in a socket provided therein, the purpose of this extension being to more positively position capacitors 152 and 153 (corresponding to capacitors 143 and 144 of Fig. 4) near the bottom of the housing 11 so that the capacitors will be sure to be covered by an adequate thickness of the moisture excluding layer of potting compound.

While references have been made above to the use of bolts and nuts for holding various parts together, other suitable fastening devices such as tubular or other rivets may be used if desired.

A suitable aperture 154 (Fig. 1) is provided in cover 12 through which, when all elements are in position, a potting compound may be poured. Slots in the upper edge of housing 11, as slots 155 and 156, provide space through which excess compound may drain off.

Figure 9:
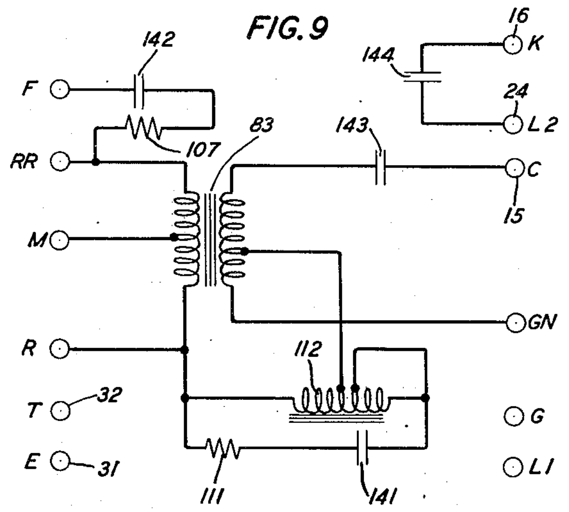
Fig. 9 is a schematic showing of the circuit arrangement of the elements of the apparatus unit.

A schematic showing of the circuit connections of the various items of the apparatus unit is provided (Fig. 9) in order to further describe the relationship of the various items. Reference may be had to the copending application of Botsford-Boyson-Aikens-Dietze-Goodale-Inglis referred to above for disclosure of the function of the various items in the over-all subscriber's telephone circuit. It might be stated here merely that autotransformer 112, resistor 111 and capacitor 141 comprise the balancing network of the anti-sidetone subscriber's circuit, resistor 107 and capacitor 142 provide for suppression of dial radio interference, induction coil 83 is a part of the anti-sidetone circuit, capacitor 143 is utilized in the transmission circuit, and capacitor 144 is utilized in the signalling circuit.

It is contemplated that the apparatus unit will be mounted within the supporting housing of the subscriber's telephone set, if it be of the combined type, and it will be apparent that the novel unit offers important advantages, particularly from the standpoint of compactness and ease of wiring, when so used. However, these features are important also when the unit is mounted apart from the telephone set proper, for example in the "bell box" and it will be apparent that the apparatus unit is applicable alike to either type of telephone set.

It will be apparent from the description that a novel apparatus unit which offers many obvious advantages from the standpoint of manufacture, installation and use has been provided. From a manufacturing standpoint marked economies result from the grouping of the various elements in one housing, testing is facilitated, and a common potting operation serves for all the collected items; the novel arrangement provided for temporarily holding the wires in position on the cover renders "mass soldering", with its attendant economies, feasible. The various novel ways in which elements such as clamping members have been designed to perform additional functions results not only in economic savings but also in the attainment of an unusually compact and mechanically efficient assembly. It will be apparent that installation of the unit is simplified by the arrangement of terminals provided and a particularly valuable feature resides in the manner in which the terminals have been divided into two groups, those likely to be changed from time to time at the subscriber's station (screw type) and those of a permanent nature which should not ordinarily be changed by the installer (soldered type). Use of the apparatus unit improves the operation of the subscriber's telephone circuit materially; an important contributing factor to this improvement arises from the fact that the metallic housing provides magnetic shielding for the elements mounted therein and thereby prevents cross-talk.

It is of course of vital importance in the operation of a modern telephone system that, both for reasons of economic operation and of good public relations, the substation equipment be as efficient and troublefree in its performance as possible and that repairs and revisions, when necessary, be made as unobtrusively as possible. All of these factors are materially furthered by use of the novel apparatus unit contemplated by the present invention.

Figures 8, 10:
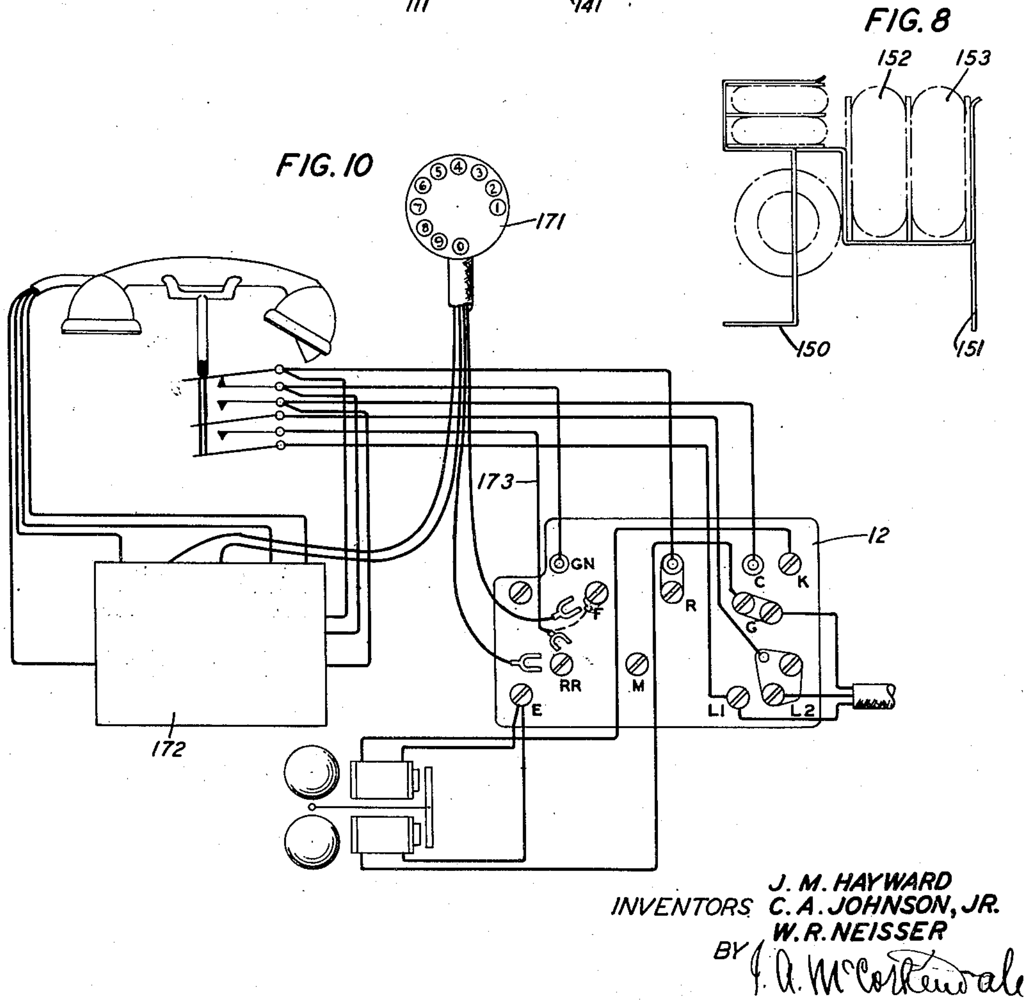
Fig. 8 shows a still further modification of the capacitor supporting means.
Fig. 10 is a schematic showing of the manner in which the apparatus unit is associated with other elements of a subscriber's telephone set.

Fig. 10 shows in a schematic fashion, how calling dial 171 may be added to a telephone subscriber's set already installed. Dial 171 will usually require four leads, two of which will be attached to the apparatus unit of the present invention and two of which will be attached to element 172 which is not a part of the present invention but the function and arrangement of which will be clear from the copending application of Botsford-Boyson-Aikens-Dietze-Goodale-Inglis referred to above. Lead 173 from the handset switch (which for manual service is connected to terminal RR of the apparatus unit) is shifted to terminal F when the change to dial service is made. As shown, the dial leads to be attached to the apparatus unit incidental to the change to dial service and lead 173, the position of which on the terminal plate is to be changed, are provided with spade type terminals and the terminal arrangement of the apparatus unit is such that only a screw-driver operation is required for attachment of the dial. In the same manner, other connections that are likely to require changing while the set is installed on the subscriber's premises are so arranged that only a screw-driver operation is required, thus eliminating the objectionable use of a soldering operation on the premises. On the other hand, connections not likely to be changed are of the soldered type in order to eliminate accidental and unintended disturbance by the installer.

While specific embodiments of the invention have been selected for detailed description the invention is not intended to be restricted in its application to such embodiments. The embodiments described should be looked upon as illustrative of the invention rather than as restrictive thereof.

What is claimed is:

1. A telephone substation apparatus unit comprising a metallic housing, a cover plate of insulating material for said housing, a plurality of electrical units positioned within said housing and supported on said cover plate, a plurality of spaced terminal members on the upper surface of said cover plate for connection of wires exterior to the apparatus unit, means for connecting said terminal members to respective points on said electrical units within said housing, and a plurality of pairs of spaced projections on the upper surface of said cover plate, each of said pairs of projections being adjacent to one of said terminal members, each projection of a respective pair being so positioned with respect to the other projection of the pair and with respect to the diameter of the wire to be attached to the associated terminal member that the space between the two projections is slightly less than the diameter of said wire.

2. In a telephone substation unit comprising a housing, a cover of insulating material for said housing, a plurality of circuit component supports on the undersurface of said cover, and a plurality of circuit components secured to said supports, the improvement which comprises a plurality of terminals on the upper surface of said cover, means connecting said components to said terminals, a plurality of exterior leads to said terminals interconnecting said components and a plurality of pairs of spaced projections on said cover adjacent certain of said terminals the projections of each pair being so positioned with respect to each other that the space between the two projections is substantially the same but slighly less than the diameter of the lead to an associated terminal member.

JOHN M. HAYWARD.
CHARLES A. JOHNSON, Jr.
WILSON R. NEISSER.

REFERENCES CITED

The following references are of record in the file of this patent:

UNITED STATES PATENTS

| Number | Name | Date |
|---|---|---|
| 1,122,290 | Mack et al. | Dec. 29, 1914 |
| 1,144,399 | Turney | June 29, 1915 |
| 1,774,421 | Carpenter | Aug. 26, 1930 |
| 1,905,276 | Erickson | Apr. 25, 1933 |
| 2,066,876 | Carpenter | Jan. 5, 1937 |
| 2,105,749 | McClelland | Jan. 18, 1938 |
| 2,233,107 | Miller | Feb. 25, 1941 |
| 2,279,713 | McLarn | Apr. 14, 1942 |
| 2,344,689 | Frazier | Mar. 21, 1944 |
| 2,409,588 | Reed | Oct. 15, 1946 |
| 2,417,420 | Knapp | Mar. 18, 1947 |

FOREIGN PATENTS

| Number | Country | Date |
|---|---|---|
| 834,981 | France | Sept. 12, 1938 |